United States Patent
Sahlman et al.

(10) Patent No.: US 6,693,902 B1
(45) Date of Patent: Feb. 17, 2004

(54) CROSS-CONNECTION ARCHITECTURE FOR SDH SIGNALS COMPRISING TIME- AND-SPACE DIVISION SWITCH GROUPS

(75) Inventors: Kari Sahlman, Oulu (FI); Tarmo Anttalainen, Espoo (FI); Pentti Lindholm, Lepsämä (FI)

(73) Assignee: Marconi UK Intellectual Property Ltd., New Century Park (GB)

( * ) Notice: Subject to any disclaimer, the term of this patent is extended or adjusted under 35 U.S.C. 154(b) by 0 days.

(21) Appl. No.: 08/843,430

(22) Filed: Apr. 15, 1997

Related U.S. Application Data

(63) Continuation of application No. 08/318,755, filed as application No. PCT/FI93/00171 on Apr. 23, 1993, now abandoned.

(30) Foreign Application Priority Data

Apr. 23, 1992 (FI) .................................................. 921822

(51) Int. Cl.[7] .............................................. H04Q 11/00
(52) U.S. Cl. ....................................... 370/369; 370/427
(58) Field of Search ................................. 370/229, 230, 370/200, 252, 351, 352, 357, 360, 366, 369, 370, 372, 375, 376, 380, 386, 400, 422, 427, 532, 534

(56) References Cited

U.S. PATENT DOCUMENTS

| 4,468,765 A | 8/1984 | Hensel et al. ................ 359/117 |
| 4,849,964 A * | 7/1989 | van Baardewijk ............ 370/63 |
| 4,998,242 A | 3/1991 | Upp ............................. 370/60 |
| 5,016,247 A * | 5/1991 | Cidon et al. ................ 370/63 X |
| 5,043,979 A * | 8/1991 | Sakurai et al. ............. 370/63 X |
| 5,121,381 A | 6/1992 | Takahashi et al. .......... 359/117 |
| 5,136,579 A * | 8/1992 | Nguyen ........................ 370/59 |
| 5,390,178 A * | 2/1995 | Hunter ......................... 370/63 |

FOREIGN PATENT DOCUMENTS

| EP | 0241783 | 10/1987 |
| GB | 2224415 | 5/1990 |
| JP | 267525 | 3/1990 |

OTHER PUBLICATIONS

Int'l Search Report dated Jul. 28, 1993, Finnish Application PCT/FI93/00171.

* cited by examiner

Primary Examiner—Dang Ton
Assistant Examiner—Phuc Tran
(74) Attorney, Agent, or Firm—Hogan & Hartson, LLP

(57) ABSTRACT

A Synchronous Digital Hierarchy (SDH) signal cross connect architecture is realized by switching the signals as bits in the space switch. The bit signals between the space switch and the time switches are multiplexed. In this way it is possible to linearly expand the capacity of the space switch to a much larger size before its quadratic expansion begins. This invention is applicable for the cross-connection of SDH signals such as Synchronous Transport Module (STM)-1 through STM-16.

11 Claims, 3 Drawing Sheets

64x64 STM-1

CROSS-CONNECTION ARCHITECTURE FOR SDH SIGNALS COMPRISING TIME-AND-SPACE DIVISION SWITCH GROUPS

This is a continuation of Ser. No. 08/318,755 filed Mar. 3, 1995, abandoned which is a 371 of PCT/FI93/00171 filed Apr. 23, 1993.

The disclosed embodiments are directed to a method for the cross-connection of Synchronous Digital Hierarchy (SDH) signals. The disclosed embodiments are directed to a cross-connection architecture for implementing the method.

BACKGROUND OF THE INVENTION

The synchronous digital hierarchy (SDH) comprises quite a large entity to be very far advanced in order to transmit time division signals in the telecommunication network. The recommendation CCITT G.707 defines the signals of the first level synchronous transport module (STM-1) for SDH signals having a transmission rate of 155.520 Mbit/s. Other defined levels are STM-4 (633.080 Mbit/s) and STM-16 (2.488.320 Mbit/s). Higher levels are under study. The recommendations CCITT G.708 specify the STM-N (where N=1, 4, 16) frame structure. The basic STM-1 frame is composed of bytes (8 bits), of which there are 2430 including the control blocks; then an STM-1 frame transmits 63 subsystem containers (e.g. TU-1, Tributary Unit, which can contain a 2 Mbit/s signal of a common 30 channel PCM system). The STM-1 frames are repeated 8000 times each second, which is the same as in the subsystem; thus each byte of a frame forms a 64 kbit/s channel. The STM-N frames are combined into logical multiframes. The SDH signals or transport modules are formed by interleaving the bytes of the subsystem signals.

The concept of the digital cross connect was developed in order to ensure a flexible growth of the telecommunications networks and to ensure more developed traffic control modes. Cross connect systems (SDH) DXC (Digital Cross Connect, CCITT draft recommendations G.sdxc-1....-3) are also under development for the synchronous digital hierarchy. The SDH DXC is defined (informally abbreviated): 'A digital SDH cross connect is a cross connect device having two or more interfaces at SDH rates (G.707) and being at least able to terminate a transmission section and to controllable, transparently connect and reconnect virtual containers (VC) between the interface ports'.

An SDH DXC can transmit traffic between different SDH levels and connect traffic between different signals. The use of the cross connect also includes a possibility for remote control of routing, initialization of reserve routes, connection from one signal to several signals (broadcasting), and so on. The connections are usually bothway connections.

The mentioned CCITT SDH recommendations try to define the logical function, i.e. a functional structure of devices, but they avoid the detailed structural description of the devices.

The digital cross connect has already been studied a long time in order to find an architecture which meets the optimal conditions. A structure which readily meets the conditions regarding capacity, non-blocking properties and implementation, is the TST (Time-Space-Time) structure, or the time-space-time cross connect, schematically shown in FIG. 1. On the left in the figure there are the input signals I1 . . . In (here STM-1 signals) and on the right there are the output signals O1...On. The time switches Ti1 . . . Tin and To1 . . . Ton on the input side and output side, respectively, change the byte positions (within a frame) within a signal. The central space switch S transmits a signal from one time switch to a signal directed to another time switch. In principle the time switches are memory elements and the space switch is composed of switch elements. According to prior art the cross connect is implemented as a module structure. The TST cross connect is also suited for very large cross connects, although then some problems arise when the system grows.

Usually the STM-1 signals are logically cross-connected on the basis of bytes through the TST switch. The byte based switching means that the actual connection is performed at the SDH TU-12 level, i.e. logically 2 Mbit/s streams are connected. The logical connection rate per STM-1 signal is about 155 Mbit/s both in the time switches and in the space switch.

The problem is primarily created by the space switch. When the capacity of the space switch is exceeded the expansion is quadratic. When for example the 16×16 basic module (16×16 STM-1) of the space switch according to FIG. 2 becomes full, then the next step is 32×32, which is realized by four 16×16 basic modules. Problems caused by the quadratic expansion are i.a.:

a) the connectors: the addition of modules always leads to multiple signal interfaces, as is shown in the example of FIG. 3. The number of connector pins increases, and sufficient physical connectors cannot be found anymore when we arrive at large space switches. Problems are not caused only by the number of pins, but also by cables, the physical strength of the printed boards, and so on;

b) thermal power: the expansion also causes multiple input/output driver circuits in the cross connect, whereby the power consumption within a module increases too much;

c) space/distance: the quadratic expansion in large cross connects causes problems regarding the available space and the data transmission rates and synchronization of the signals when the distances between the basic modules of the space switch increase considerably.

Further it must be observed that even a preparation for the expansion causes the disadvantages according to points a) and b) above, in other words, when we make preparations for a very large expansion, then the interfaces required by the expansion reduce the maximum capacity of the basic module, or the planned maximum capacity as such accelerates the quadratic expansion. FIG. 3 illustrates the quadratic expansion in a situation where the space switch has to switch a quadruple number, or 64 input signals to 64 output signals. Then the required number of basic modules increases to 16.

SUMMARY OF THE INVENTION

The object of the invention is now to present for the cross-connection of SDH signals a method and an architecture realizing the method, with which the need for the quadratic expansion can be postponed to a much later point. The object is also to reduce the number of required space switch modules in large cross connects.

DESCRIPTION OF THE PREFERRED EMBODIMENTS

Thus in a conventional TST cross connect structure 'packets' or bytes comprising 8 consecutive bits are connected through the cross connect. For this byte or these 8 bits the space switch thus makes only one new connection at the beginning of the byte, and the rest of the time the bits are connected through the switch by the same routing (this is what happens logically thinking; in practice the bits of the byte may be rearranged and connected in some suitable form within the space switch). It could be said that in the conventional solution each byte 'consumes' the interface capacity of the space module, in other words the maximum number of signals in the module depends on the transmission capacity (the bit rate) and the number of pins in the connectors.

The implementation of the invention is based on the fact that the time slot of a byte is utilized more efficiently, or the logical unit (=byte) is divided into smaller parts, and the parts or the bits of the byte are transmitted in parallel form through the space switch. Then the capacity of the space switch is utilized more efficiently. The implementation is also based on the fact that then each bit can be switched through the space switch independently of the other bits in the byte.

Parallell bit processing as such is no novelty. For example digital central offices have used time-space-time switches, in which the bytes are switched in a parallel mode through the switch means. This however relates to the fully parallel processing of the bits in a 2 Mbit/s channel time slot, both through the time and the space switch, whereby all bits in the time slot (byte) are processed in parallel, and the byte is connected in parallel mode through the whole TST switch. The primary goal has been to reduce the operating rate of the switches, but the logical structure of processing of the byte was not concerned. (See e.g. J-H. Pasanen, R. Maïhäniemi: 'Välitystekniikan perusteet' (Switching Technology Basics), p. 180–191; The Students' Union at the University of Technology, Otaniemi, Finland, 1975.) In the present invention the bytes are instead treated in a different way in the time switches and in the space switch, and further the bits of the byte can be processed in the space switch independently of the other bits. The present invention further relates to the cross-connection of SDH signals.

According to the invention, in the time switch at the input side of the cross connect, each byte is divided into parts or into bits, which are disassembled into a 'parallel form', or the parts are transmitted to separate lines. The lines of these partial bytes are connected to the space switches. When the division is made into bits, 8 space switches are now required for each basic module. On the other hand the capacity or the number of input lines and output lines of the module increases in the same proportion, or it will be eightfold. As an example the 16×16 space switch of FIG. 1 will now be a 128×128 switch, which earlier required 64 space switch modules (or 8×8). With the aid of this we can use linear expansion to the eightfold capacity, compared to the earlier situation.

As an alternative for the division of the byte into bits it is conceivable to divide the byte after the time switch into two half-bytes, which then are switched through different space switches to the time switch on the output side. Then 32 space modules would be required for a 128×128 space switch.

Another implementation in the invention is to combine the bits of several STM-1 signals of the same value for the transmission between the switches into 'packets', for example so that always the same value bits from four STM-1 signals are taken and multiplexed into a serial mode 'packet' before the transmission to the space switch. Then the multiplexing is made in the transmitting time switch elements, and after the transmission a corresponding demultiplexing is made in the space switch. A corresponding operation is repeated between the space switch and the output time switches. The multiplexing is here a physical operation for the transmission, whereby one conductor pair for each transmitted 'packet' will be enough between the switch modules, or if four bits are combined, then also the corresponding number of connector pins and driver circuits of the connectors will decrease to a fourth. The multiplexing/demultiplexing slightly increases the need for circuits, but in an advantageous way this could be handled by circuit integration solutions. The savings in connector pins and driver circuits (space; power) is a much more important achievement.

The method and the cross-connection architecture can be used at all SDH levels, or for the cross-connection of all defined signals STM-1... STM-16 and of other corresponding signals. While the enclosed figures are based on a traditional space switch module, which has 16 input and 16 output interfaces for STM-1 signals, it is quite natural that smaller and particularly bigger signal line numbers can be applied within the inventive idea, so that e.g. in bit based space switching it is possible to use space switch modules having more than 128×128 signal interface lines.

According to the present invention the capacity of the space switch modules in the cross connect will be efficiently used, and accordingly the number of the used modules will decrease considerably when we go towards larger cross connects. Now it is possible to delay the quadratic expansion to a much later point.

The invention is described below with the aid of examples with reference to the enclosed figures.

Figure 1:
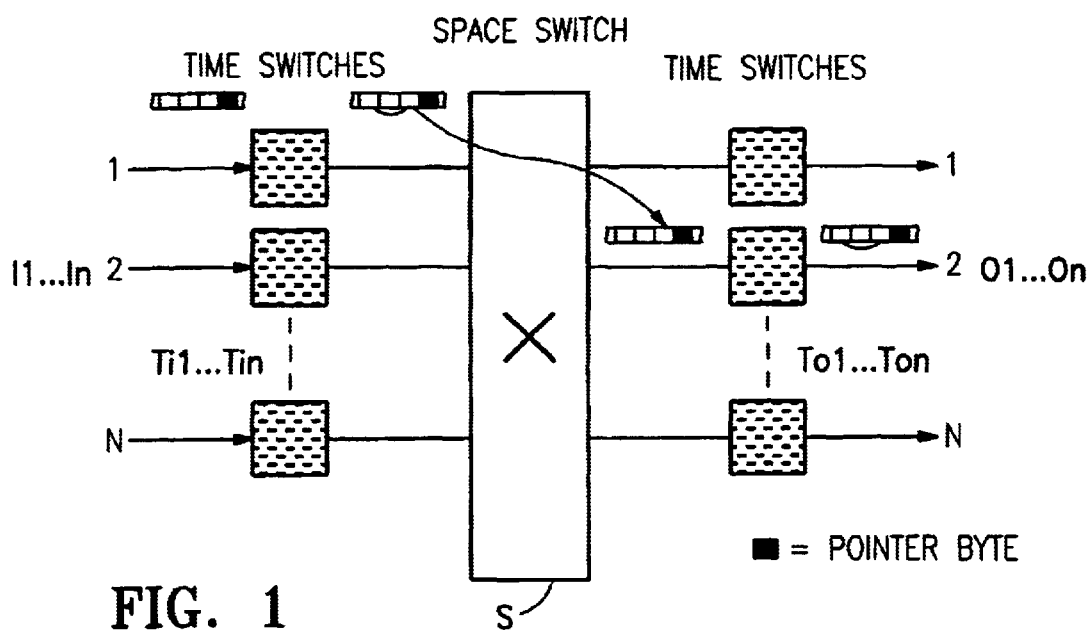
FIG. 1 shows the principle of the time-space-time cross-connection already described, whereby it is possible to divide the byte into parts according to the invention in the space switch.
Figure 2:
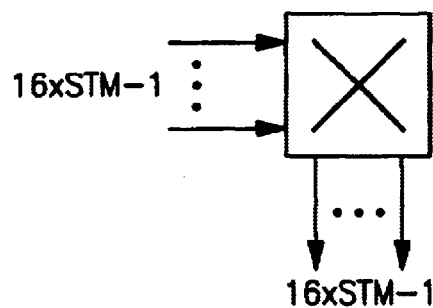
FIG. 2 shows schematically a space switch module of SDH signals having 16 STM-1 inputs and 16 STM-1 outputs.
Figure 3:
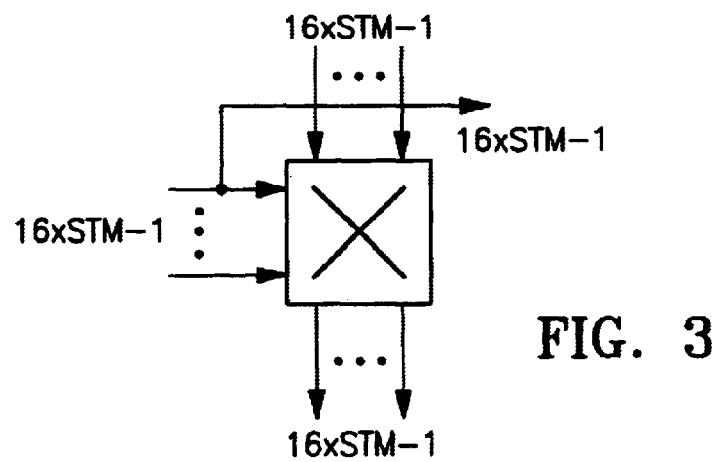
FIG. 3 shows how the space switch module according to FIG. 1 is prepared for the expansion of the space switch, whereby each input signal is branched in order to be connected to a second or other space switch modules.
Figure 4:
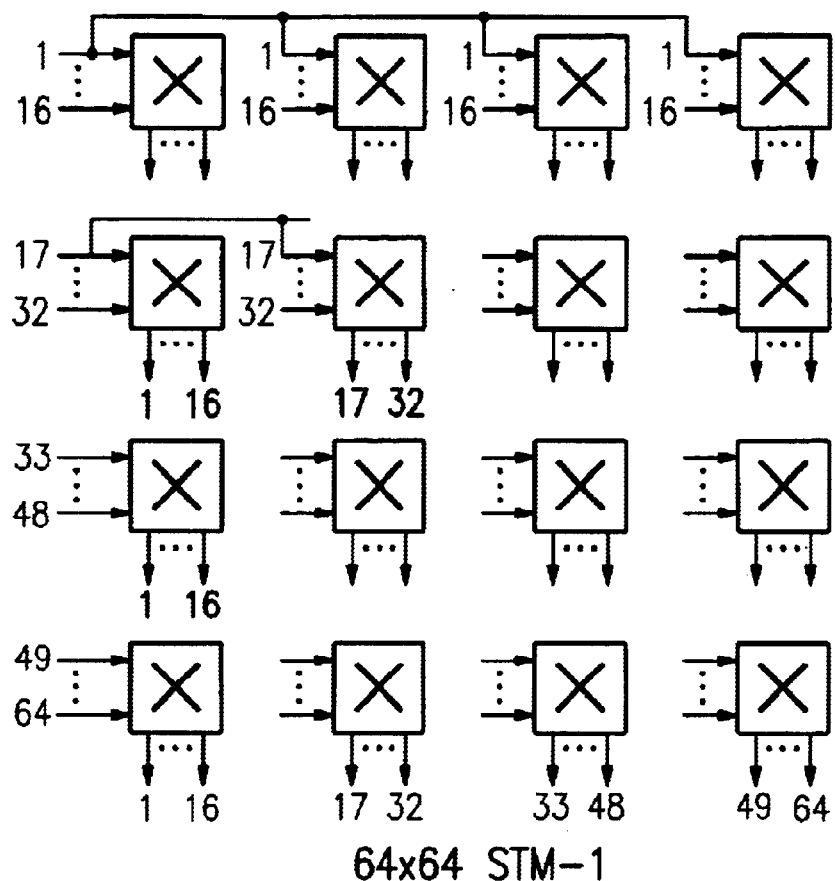
FIG. 4 shows a space switch having 64 inputs and 64 outputs, whereby the space switch is realized by 16×16 space switch modules according to FIG. 1.

The description is based on the fact that the digital SDH cross connect DXC according to the invention uses already existing switch modules in a more efficient way to cross-connect STM-1 signals. On the STM-1 level the transmission rate is 155.520 Mbit/s. The time switches Ti1 ... Tin according to FIG. 1 can be included in the interface subracks for the STM-1 signals. Each time switch realizes the rearrangement of the time slots or bytes in accordance with the route selection calculated by the decoder processor control before they are transmitted to the space switch. The time switches To1 . . . Ton also change the places of the bytes within the respective STM-1 signal. Between the time switches there is the space switch; to the space switch basic module according to FIG. 2 it is for example possible to connect STM-1 signals from 16 time switches, and correspondingly the outputs to 16 time switches.

The functional changes of the switch modules described below can be realized by slight internal component additions and corresponding software changes. It is not necessary to make any substantial changes in the basic structures or the mechanical construction of the cross connect.

The bytes of the respective signal is divided into bits in the time switches Ti1 . . . Tin at the input side, the 8 bits then being available in parallel mode at the time switch outputs. When the STM-1 signals physically are connected to the cross connect so that each interface subrack has four STM-1 signals, then the signals obtained from the time switches in this subrack can be multiplexed by simple means. For the transmission to the space switch the bits of the same value in the chronological order (i.e. the bits with the same consecutive number) in each stream containing four STM-1 signals are extracted according to the invention, and these four extracted bits are combined or multiplexed into a serial mode transmission signal. The multiplexing is realized within the time switches in the interface subrack. The transmission signal thus multiplexed has a bit rate of about 80 Mbit/s, or about 155 Mbit/s divided by eight and multiplied by four, and it can be transmitted on one line to the input of the space switch. Thus from four time switches in total eight transmission signal lines (or pairs) are directed to the space switches; conventionally thinking there would have to be eight signals from each time switch, or in total 32 signals from four switches. Thus with the solution according to the invention the need for connector pins will be substantially less.

The space switch modules are arranged into a central switch subrack. Each space switch module receives the transmission signals which are demultiplexed into parallel bits. At the space switch output the space switched bits are correspondingly multiplexed into a transmission signal to be transmitted to the time switch on the output side. Thus the space switch requires as added components multiplexers/demultiplexers and bit synchronization. In the space switch the bits are shifted from the respective input signal to the selected output signal, or there is performed a space switching.

The time switches at the output side perform the same complimentary operations as at the input side, or the bit based transmission signals are demultiplexed and again combined into bytes, after which they are time switched and the signals thus cross-connected are then output from the cross connect as the outgoing STM-1 signals.

Figure 6:
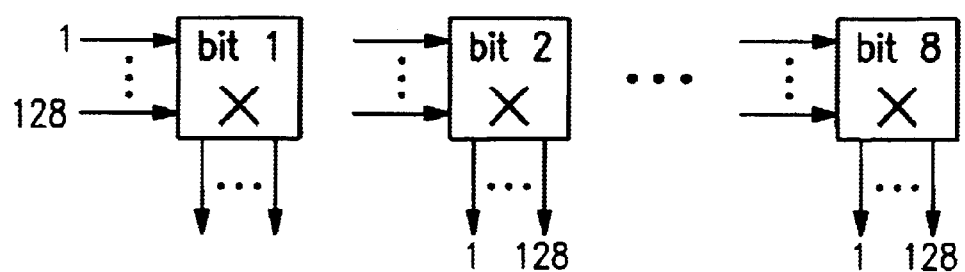
FIG. 6 contains an implementation with 16×16 space switch modules according to FIG. 1, when each byte to be connected according to the invention is divided into bits being switched in parallel through the space switch modules, to which it is possible to connect 128 respective input signals.
Figure 7:
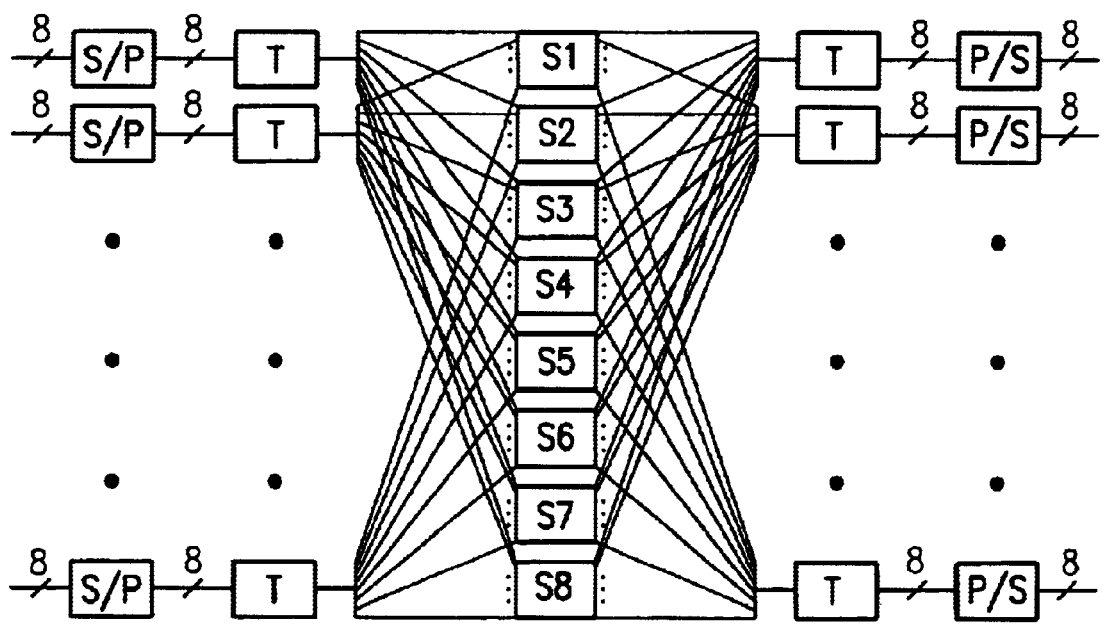
FIG. 7 shows the connections between the different elements in a time-space-time cross connect when the connection is realized according to the invention.

FIG. 6 shows a space switch basic module according to the invention having eight space switches in parallel. In this figure there are 128 incoming bit signals and 128 outgoing bit signals, because instead of 16 bytes the same space switch rate can handle 128 bits. Physically these logical input and output signals appear in the space switch interfaces as only 32 pins due to the multiplexing of the transmission signals. The connection routes of the cross connect are shown in FIG. 7.

The expansion of the space switch can be examined more generally for large units. When the byte of an STM-1 signal is divided into n parts, which are switched in parallel through the space switch, then we need $s=n\times(L/y)^2/n^2$ space switch modules, where n is said number of parallel parts of the byte, L is the number of STM-1 incoming to the cross connect/outgoing from the cross connect, and y is the number at the STM-1 level of input/output lines of a space switch module, when we assume that $L=2^m$, and that m is greater or equal to 4. When for instance there are L=128 incoming lines, the basic module has y=16 lines, and when the byte is divided into n=8 parts, then the number of space switches is $s=8\times((128/16)/8)^2$ 32 8. On the other hand, if L=512, y=16 and n=8, then s=128, compared to the conventionally required 1024 space switch modules.

Figure 5:
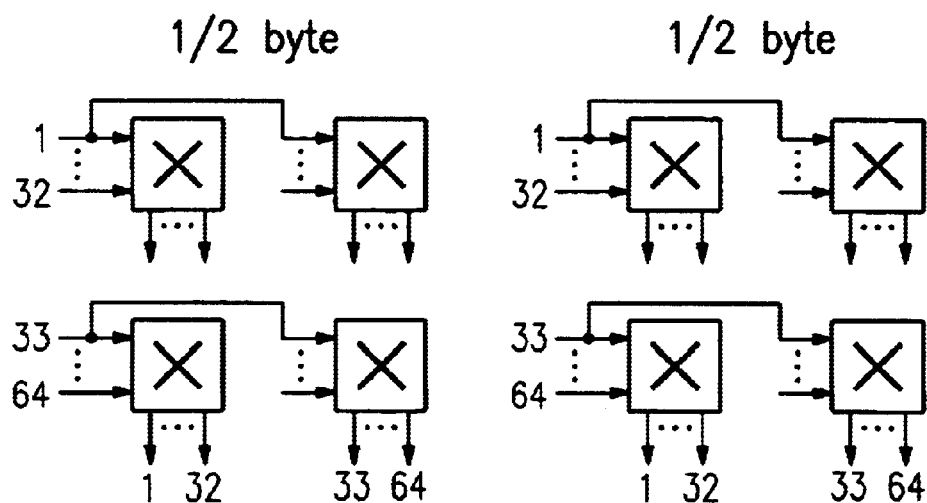
FIG. 5 shows an implementation of the space switch when each byte to be connected according to the invention is divided into two half-bytes, whereby the space switch of FIG. 3 can be replaced by eight space switch modules, to which 32 respective input signals are connected.

Above we have examined in more detail the division of the bytes into bits. Alternatively the byte could e.g. be divided according to FIG. 5 into half-bytes. In some cases this solution may be advantageous. The case of FIG. 5 also shows the principle how the 'divided' space switch is expanded, i.e. the space switch of each byte part has a quadratic expansion.

In the bit based solution of FIG. 6 the expansion of the space switch from the size 128×128, having 8 basic modules, to a size of 256×256, requires that each basic module is replaced by four basic modules, thus in total 32 basic modules. If we would use the conventional byte switching and 16×16 STM-1 signal modules, then we would need 16×16=256 of these 16×16 basic modules.

The construction details of the SDH cross connect are not explained in greater detail in this specification, because regarding the above description they are of less importance, and a person skilled in the art after reading the above specification can readily understand how advantageously the inventive idea can be put into practice. Neither do the numerical values of the embodiment examples above limit the scope of the invention, which is presented in the enclosed claims.

What is claimed is:

1. A method for cross-connecting digital signals through a digital cross connect, the digital cross connect having a plurality of time switches and a plurality of space switches, wherein the inputs to the cross connect and outputs from the cross connect include high speed serial mode data streams having a logical frame structure having input bytes as logical units to be transmitted and cross-connected, the method comprising:

partitioning each input byte of each digital signal into a first number of parallel parts at a first time switch, each parallel part including a predetermined number of bits;

separately switching each parallel part at one of a first number of parallel space switch modules to provide switched parallel parts, each space switch module being associated with one of the parallel parts; and combining the switched parallel parts into output bytes to provide an output from a second time switch.

2. The method according to claim 1, wherein each input byte is partitioned into two half-bytes; and each half byte is separately switched through an associated space switch module.

3. The method according to claim 1, wherein each input byte is partitioned into four parts, each part being composed of two bits.

4. The method according to claim 1, wherein each input byte is partitioned into parts having a single bit each; and each bit is separately switched through an associated space switch module.

5. The method of claim 4, further comprising multiplexing respective bits with the same consecutive number at the first time switch; and demultiplexing the multiplexed bits at the space switch modules.

6. The method according to claim 5, the method further including combining four bits or more into a transmission signal between the time switch modules and the space switch modules.

7. The method according to claim 1, wherein the digital signals are one of STM-1, STM-4 and STM-16 signals.

8. The method according to claim 1, wherein the cross-connection is bi-directional.

9. The method according to claim 1, wherein the cross connect is a time-space-time cross connect.

10. A digital cross connect architecture for the cross-connection of synchronous digital hierarchy signals, the cross connect architecture comprising time switches and space switches connected in succession, wherein digital input and output signals of the cross connect are high speed serial mode data streams in a byte format, the digital cross connect architecture comprising:

means for partitioning each byte of each input digital signals into a first number of parallel parts, each parallel part including a predetermined number of bits;

a plurality of parallel space switch modules, each space switch module separately switching one of the parallel parts from each byte of each input digital signal to an output; and means for combining the switched parallel parts into output bates.

11. Cross connect architecture according to claim 10, wherein the cross connect is a time-space-time cross connect.

* * * * *